(12) United States Patent
Naderlinger et al.

(10) Patent No.: US 11,499,576 B2
(45) Date of Patent: Nov. 15, 2022

(54) MOUNTING ELEMENT HAVING PRESSURE LIMITATION

(71) Applicant: B&R INDUSTRIAL AUTOMATION GMBH, Eggelsberg (AT)

(72) Inventors: Martin Naderlinger, Schalchen (AT); Erwin Birgmann, Moosdorf (AT); Daniel Mair, Grieskirchen (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 439 days.

(21) Appl. No.: 16/057,230

(22) Filed: Aug. 7, 2018

(65) Prior Publication Data
US 2019/0048915 A1 Feb. 14, 2019

(30) Foreign Application Priority Data
Aug. 8, 2017 (EP) ..................................... 17185298

(51) Int. Cl.
*F16B 2/06* (2006.01)
*B25B 5/10* (2006.01)

(52) U.S. Cl.
CPC ............... *F16B 2/065* (2013.01); *B25B 5/101* (2013.01)

(58) Field of Classification Search
CPC ........... B25B 5/067; B25B 5/082; B25B 5/10; B25B 5/101; B25B 5/104; B25B 5/408;
(Continued)

(56) References Cited

U.S. PATENT DOCUMENTS 74,025 A * 2/1868 Yale, Jr. .................... B25B 5/10
269/160
1,506,500 A * 8/1924 Ripamonti .......... F16B 23/0076
411/910

(Continued)

FOREIGN PATENT DOCUMENTS

DE 939 058 2/1956
DE 298 12 351 3/1999
(Continued)

OTHER PUBLICATIONS

Europe Office Action issued in counterpart Europe Appl. No. EP 17 18 5298 (dated Jan. 17, 2018) (with partial machine translation).

*Primary Examiner* — Jonathan Liu
*Assistant Examiner* — Guang H Guan
(74) *Attorney, Agent, or Firm* — Greenblum & Bernstein, P.L.C.

(57) ABSTRACT

A mounting element which allows for safe mounting of a module on a main body, the contact pressure acting on the module or on the main body not exceeding a maximum pressure, includes a control unit, a resilient clamping element and an actuation element. The control unit includes a pressure element and a counterpressure element, and the resilient clamping element is connected to the pressure element and to the counterpressure element. The actuation element includes a tool holder having a mounting recess and increases or reduces a contact pressure of the resilient clamping element between the pressure element and the counterpressure element when actuated in a tightening direction and a release direction, respectively. The mounting element further includes a displacement element that is connected to the clamping element and fills the mounting recess of the tool holder as soon as the contact pressure exceeds a maximum pressure.

10 Claims, 5 Drawing Sheets

(58) Field of Classification Search
CPC . B25B 5/125; B25B 1/10; B25B 5/108; F16B 2/065; F16B 2/12; F16B 23/0076; F16B 23/0092; F16B 31/027; F16B 5/0266; B23Q 3/06
USPC .... 248/229.15, 229.25, 228.6, 230.6, 231.71
See application file for complete search history.

(56) References Cited

U.S. PATENT DOCUMENTS

| | | | |
|---|---|---|---|
| 1,919,812 A | 7/1933 | Swanson | |
| 2,612,794 A * | 10/1952 | Pleasance | B23Q 3/06 269/157 |
| 2,867,003 A * | 1/1959 | Stiles | B29C 39/006 249/82 |
| 3,055,654 A * | 9/1962 | Harrison | B25B 5/101 269/241 |
| 3,581,625 A * | 6/1971 | Michalak | F15B 15/20 91/45 |
| 3,683,988 A * | 8/1972 | Carter | F16B 39/10 411/105 |
| 3,797,721 A * | 3/1974 | Clumb | B25C 1/126 227/9 |
| 4,034,971 A * | 7/1977 | Tsuyama | B23K 37/0435 269/249 |
| 4,692,075 A | 9/1987 | Metz | |
| 6,086,282 A | 7/2000 | Dutt et al. | |
| 6,238,155 B1 | 5/2001 | Aukzemas et al. | |
| 7,325,470 B2 * | 2/2008 | Kay | A61B 17/888 606/279 |
| 9,194,417 B2 | 11/2015 | Marchand et al. | |
| 9,248,537 B2 * | 2/2016 | O'Neill | F16B 13/04 |
| 2007/0003361 A1 | 1/2007 | Wang | |
| 2010/0024586 A1 | 2/2010 | Heldmann | |
| 2019/0048915 A1 * | 2/2019 | Naderlinger | F16B 5/0266 |
| 2020/0400182 A1 * | 12/2020 | Yang | F16B 39/282 |

FOREIGN PATENT DOCUMENTS

| | | |
|---|---|---|
| DE | 199 03 539 | 8/1999 |
| DE | 10 2011 106 696 | 1/2013 |
| GB | 828 194 | 2/1960 |
| WO | 2008/003407 | 1/2008 |

* cited by examiner

Fig. 1A p ≤ pmax

Fig. 1B p ≥ pmax

MOUNTING ELEMENT HAVING PRESSURE LIMITATION

CROSS-REFERENCE TO RELATED APPLICATIONS

The present application claims priority under 35 U.S.C. § 119(a) of Europe Patent Application No. 17185298.1 filed Aug. 8, 2017, the disclosure of which is expressly incorporated by reference herein in its entirety.

BACKGROUND OF THE INVENTION

1. Field of the Invention

The present invention relates to a mounting element comprising a control unit, a resilient clamping element and an actuation element, the control unit comprising a pressure element and a counterpressure element, and the resilient clamping element being connected to the pressure element and to the counterpressure element, and the actuation element comprising a tool holder having a mounting recess and increasing or reducing a contact pressure of the resilient clamping element between the pressure element and the counterpressure element when actuated in a tightening direction and a release direction, respectively. The present invention further relates to a method for mounting a module on or dismantling a module from a main body, a clamping element exerting a contact pressure between a pressure element that is engaged with the main body and a counterpressure element that is engaged with the main body, a mounting tool being introduced into a mounting recess of a tool holder of an actuation element and being actuated in a tightening direction or a release direction in order to increase and reduce, respectively, the contact pressure.

2. Discussion of Background Information

Modules, such as panels, keyboards or other input/output units for industrial electronics often need to be fixed to a main body, for example a cabinet wall. Mounting elements are used for this purpose, which elements are hooked into the module to be fastened. Said mounting elements each comprise a screw that is screwed into an internal thread of the relevant mounting element and is oriented in the direction of the main body or of the portion of the main body to be clamped. If the screw is tightened, it extends out of the internal thread of the mounting element towards the main body, as a result of which the main body is clamped and fixed against a counterpressure surface of the module, and the position of the module on the main body is ensured. Furthermore, the clamping can often also ensure a specified type of protection (e.g. protection against moisture), for example by compressing a seal between the module and the main body.

The torque acting on the screw should not exceed a maximum torque, e.g. 0.1 Nm, which may otherwise lead to overstressing or even to destruction of the mounting element or of the module, in particular if an entirely unsuitable mounting tool, e.g. a cordless drill, is used for mounting. In order to limit the acting torque, a torque wrench can of course be used or specified as the mounting tool. This cannot, however, rule out operating errors, since the user may set an unsuitable torque on the torque wrench or may entirely omit to use a torque wrench. In addition, torque wrenches are associated with distribution of the torque that is set, which distribution is caused inter alia by different coefficients of friction. U.S. Pat. No. 4,692,075 A, DE 298 12 351 U1, DE 199 03 539 A1, U.S. Pat. No. 6,238,155 B1 and DE 10 2011 106 696 A1 disclose mounting elements that comprise an integrated torque-limiting means. In this case, a locking mechanism in the mounting element is used to limit the acting torque. This means, in principle, that the torque limitation is outsourced from the mounting tool (i.e. the torque wrench) to the mounting element, thus ensuring that the maximum torque is not exceeded even if a torque wrench is not used.

SUMMARY OF THE EMBODIMENTS

Embodiments of the invention specify an alternative mounting element that allows for safe mounting of a module on a main body, the contact pressure acting on the module or on the main body not exceeding a maximum pressure.

According to embodiments, the mounting element comprises a displacement element that is connected to the clamping element and fills the tool holder region of the tool holder as soon as the contact pressure exceeds a maximum pressure. Embodiments furthermore include a method, in which a displacement element fills the mounting recess as soon as the contact pressure exceeds a maximum pressure, such that the mounting tool is displaced out of the mounting recess, with the result that the actuation element can no longer be actuated by the mounting tool. This allows for safe mounting of the module on the main body, the module or the main body, and also the mounting element, being protected from too high a contact pressure and associated material fatigue or breakage. Furthermore, it is not necessary to use a torque wrench, because the contact pressure cannot exceed the maximum pressure. The maximum pressure between the pressure member and the counterpressure member (that further acts on the module and on the main body) can be set by means of a suitably selected clamping element. The clamping element is clamped or unloaded by actuating the actuation element, as a result of which the acting contact pressure is adjusted. In principle, the module can be mounted more quickly using a mounting element according to the invention, for example if a cordless drill is used as the mounting tool. After the maximum pressure has been reached, the actuation element can no longer be actuated via the for example hexagonal mounting recess of the tool holder, because the mounting tool, for example an Allen wrench, can no longer be inserted into the mounting recess because said recess is filled by the displacement element. However, in this case "filled" does not mean that the entire volume of the mounting recess has to be filled, but merely that the depth thereof into which the mounting tool can be inserted is filled at least in part. If the mounting recess has a specific depth and a specific cross-section, it is thus sufficient for the depth to be filled in part by the displacement element. It is not essential, however, to fill the entire cross-section of the mounting recess in order to displace the mounting tool.

The tool holder advantageously comprises a dismantling recess which allows the actuation element to be actuated in the release direction, in order to reduce the contact pressure, when the mounting recess is filled by the displacement element. The actuation element can thus continue to be actuated via the dismantling recess, using a dismantling tool, but only in the release direction. It is thus possible to dismantle the mounting element, which would no longer be possible using the mounting element because the displacement element in the mounting recess no longer allows use of the mounting tool.

The dismantling recess may comprise a flank that is beveled in the tightening direction. This may in principle correspond to a reversal of the design of a one-way slotted screw head. However, in the present invention, tightening in the tightening direction is prevented, whereas in the case of a one-way slotted screw release is prevented in that the screw head comprises a beveled flank in the release direction. It would thus be possible to actuate the actuation element in the release direction, for example using a slot-head screwdriver as the release tool, because the dismantling tool strikes the edges of the flanks. Actuation in the tightening direction is prevented because the dismantling tool slips over the slopes of the flanks.

The dismantling recess may be less deep than the mounting recess. This is advantageous if the mounting recess and the dismantling recess extend over a common portion of the cross-section of the tool holder. If the mounting recess is centered, for example, and the dismantling recess is annular (optionally having beveled flanks), the mounting recess and dismantling recess can thus be of different depths or the mounting recess may even be less deep than the dismantling recess. Of course, the dismantling recess needs to be designed such that, when the mounting recess is filled by the displacement element, the depth of said dismantling recess is not also filled such that the dismantling tool is displaced.

Advantageously, the pressure element may be formed as a bush having a central axially continuous recess and an internal thread may be arranged at a first axial end of the recess of the pressure element.

This is most particularly advantageous if an external thread of the actuation element is screwed into the internal thread of the pressure element. As a result, the actuation element is engaged with the pressure element, and therefore the counterpressure element is also resiliently coupled to the actuation element by means of the clamping element. The contact pressure can thus be adjusted by means of the thread position of the internal thread and external thread, with the result that successive adjustment of the acting contact pressure is possible.

Furthermore, the pressure element and the counterpressure element may be movable relative to one another in the direction of the contact pressure. It is thus possible to move the mounting element into position, prior contact with the module and main body not being required. When the actuation element is actuated in the tightening direction, the pressure element and the counterpressure element are moved towards or away from one another, depending on the embodiment, until the pressure element is in contact with the module and the counterpressure element is in contact with the main body. As soon as this contact has been established, the pressure element and counterpressure element can no longer be moved relative to one another and, when the actuation element is actuated in the tightening direction, the contact pressure between the pressure element and the counterpressure element builds up further until the contact pressure reaches the maximum pressure. In this embodiment, different geometries of modules and main bodies can be fixed to one another using a flexible and length-adjustable mounting element. If the pressure element and counterpressure element cannot be moved relative to one another, the geometries of the pressure element and counterpressure element would thus have to be adjusted to the geometries of the module and the main body.

A central, axially continuous recess may be provided on the actuation element, the mounting recess being provided on a first axial end of the actuation element and the displacement element being arranged in the recess of the actuation element.

Furthermore, a central axially protruding pin may be provided on the counterpressure element, which pin forms the displacement element and is arranged in the recess of the actuation element.

Alternatively, a bolt is provided, the first axial end of which forms the displacement element that is arranged in the recess of the actuation element, and the opposing second axial end of which forms the counterpressure element that passes through a recess on the pressure element.

Moreover, the clamping element may be arranged between the actuation element and the counterpressure element, allowing a more uniform distribution of the pressure over the cross-section of the pressure element and counterpressure element.

Furthermore, the clamping element may be formed as a spring, preferably as a spiral spring. When a suitable spring having desired parameters such as the spring force is selected, the maximum pressure can be set particularly precisely.

Other exemplary embodiments and advantages of the present invention may be ascertained by reviewing the present disclosure and the accompanying drawing.

BRIEF DESCRIPTION OF THE DRAWINGS

The present invention will be described in greater detail in the following with reference to FIGS. 1 to 5, which schematically show non-limiting, advantageous embodiments of the invention by way of example. In the drawings.

DETAILED DESCRIPTION OF THE EMBODIMENTS

Figure 1A:
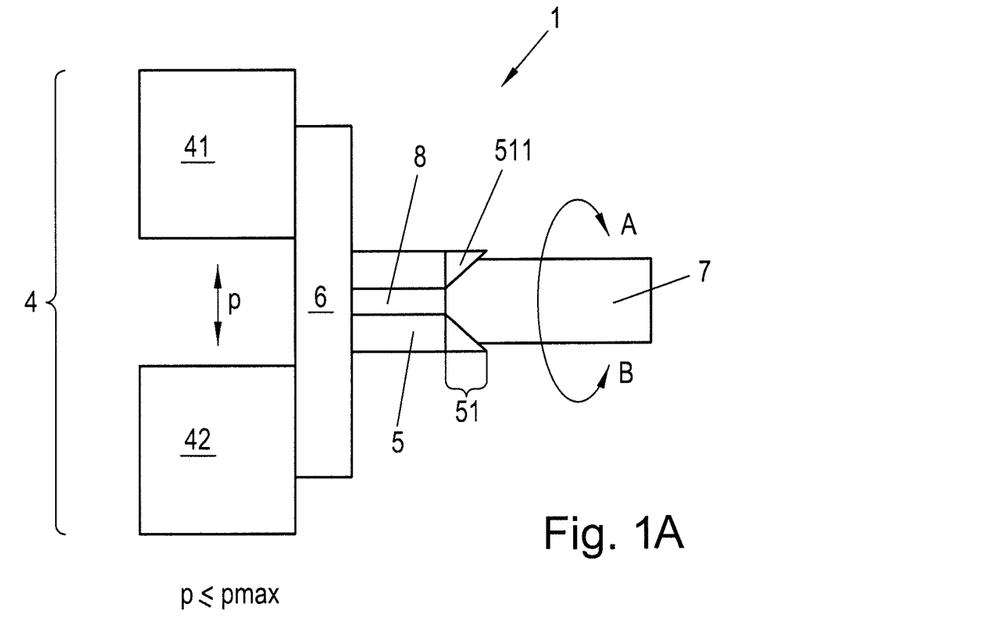
FIGS. 1A, B schematically show a mounting element.
Figure 1B:
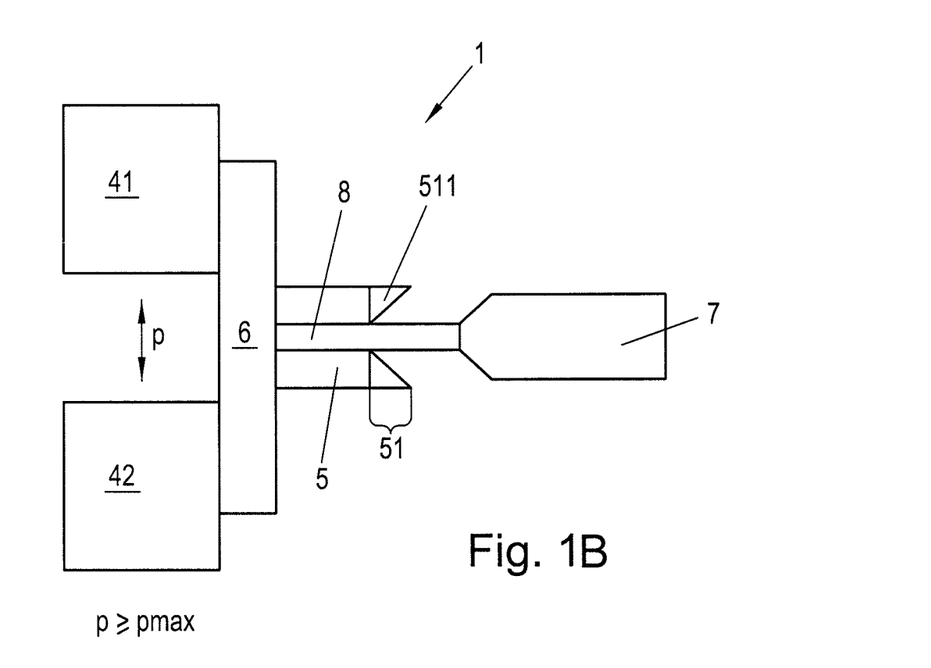

FIGS. 1A and B show the schematic structure of a mounting element 1 according to the invention. In this case, a control unit 4, or a controller 4, comprises a pressure element 41 and a counterpressure element 42 which are arranged so as to be movable relative to one another and are connected to a resilient clamping element 6. In this case, the clamping element 6 acts on the pressure element 41 and on the counterpressure element 42 and exerts a contact pressure on the pressure element 41 and on the counterpressure element 42. Since the pressure element 41 and the counterpressure element 42 are interconnected by means of the clamping element 6, does not necessarily mean that this interconnection must occur directly, but rather simply that the clamping element 6 can exert a contact pressure p between the pressure element 41 and the counterpressure element 42. This may also be achieved for example by means of an indirect connection via further components (e.g. the actuation element 5, as set out below). For this purpose, the clamping element 6 may also be arranged between the pressure element 41 and the counterpressure element 42 for example. The pressure element 41 and the counterpressure element 42 are shown as separate components here, but may also simply be portions of the control unit 4 that are movable relative to one another. In this case, the control unit 4 must be resilient in order for the pressure element 41 and a counterpressure element 42 to be movable relative to one another, and in order for it to be possible to generate a contact pressure p between the pressure element 41 and the counterpressure element 42. It would then also be conceivable for the clamping element 6 to also be integrated in the control unit 4, i.e. for the control unit 4 to unite the pressure element 41, the counterpressure element 42 and the clamping element 6 in one resilient component.

An actuation element 5 of the mounting element 1 comprises a tool holder 51 comprising a mounting recess 511 in which a mounting tool 7, for example a screwdriver or an Allen key, can be inserted. When the actuation element 5 is actuated by the mounting tool 7, in a tightening direction A or release direction B, a contact pressure p of the resilient clamping element 6 between the pressure element 41 and the counterpressure element 42 can be increased or reduced, respectively. For this purpose, the actuation element 5 acts on the mounting element 1 in a suitable manner in order to clamp or unload the clamping element 6. The tightening direction A and release direction B may describe rotary, linear or other directions, depending on the implementation of the actuation mechanism.

A displacement element 8 of the mounting element 1 is connected to the clamping element 6 in a suitable manner, so as to fill the mounting recess 511 of the tool holder 51 as soon as the contact pressure p exceeds a specified maximum pressure pmax. The displacement element 8 may for example be pushed by the clamping element 6, may be resilient, or may be actuated in another manner. In FIG. 1a, the contact pressure p is less than or equal to the maximum pressure pmax, as a result of which the actuation element 5 can still be operated in the tightening direction A or in the release direction B by means of a mounting tool 7 and via the mounting recess 511 of the tool holder 51. FIG. 1b shows the case where the contact pressure p is greater than the maximum pressure pmax. In this case, the displacement element 8 fills the mounting recess 511, with the result that the mounting recess 511 can no longer be operated by means of the mounting tool 7. "Fills" does not necessarily mean completely filling the mounting recess 511, but instead just filling said recess as far as is necessary in order to prevent the mounting tool 7 from being able to engage with the mounting recess 511 in order to actuate the actuation element 5.

Figure 2A:
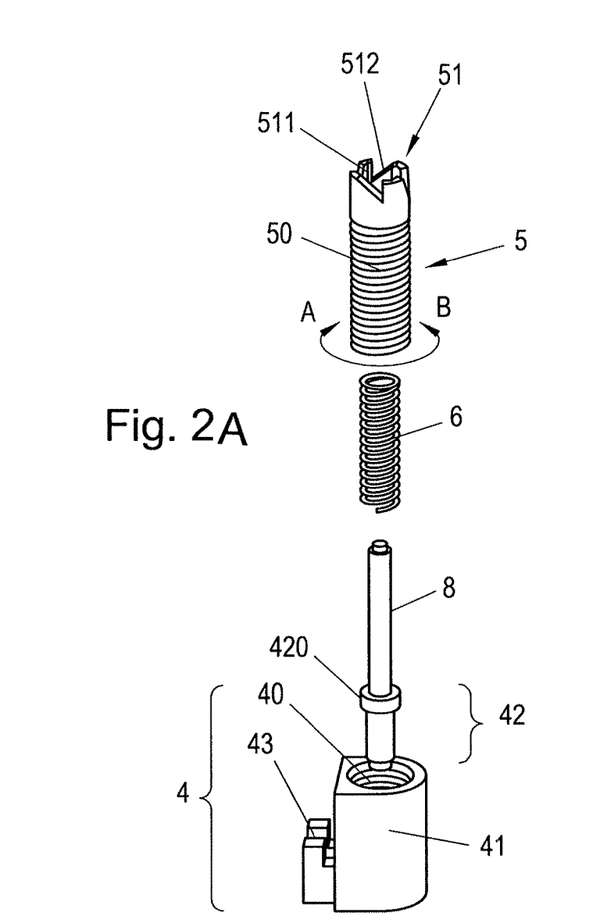
FIGS. 2A, B show a first embodiment of the mounting element.
Figure 2B:
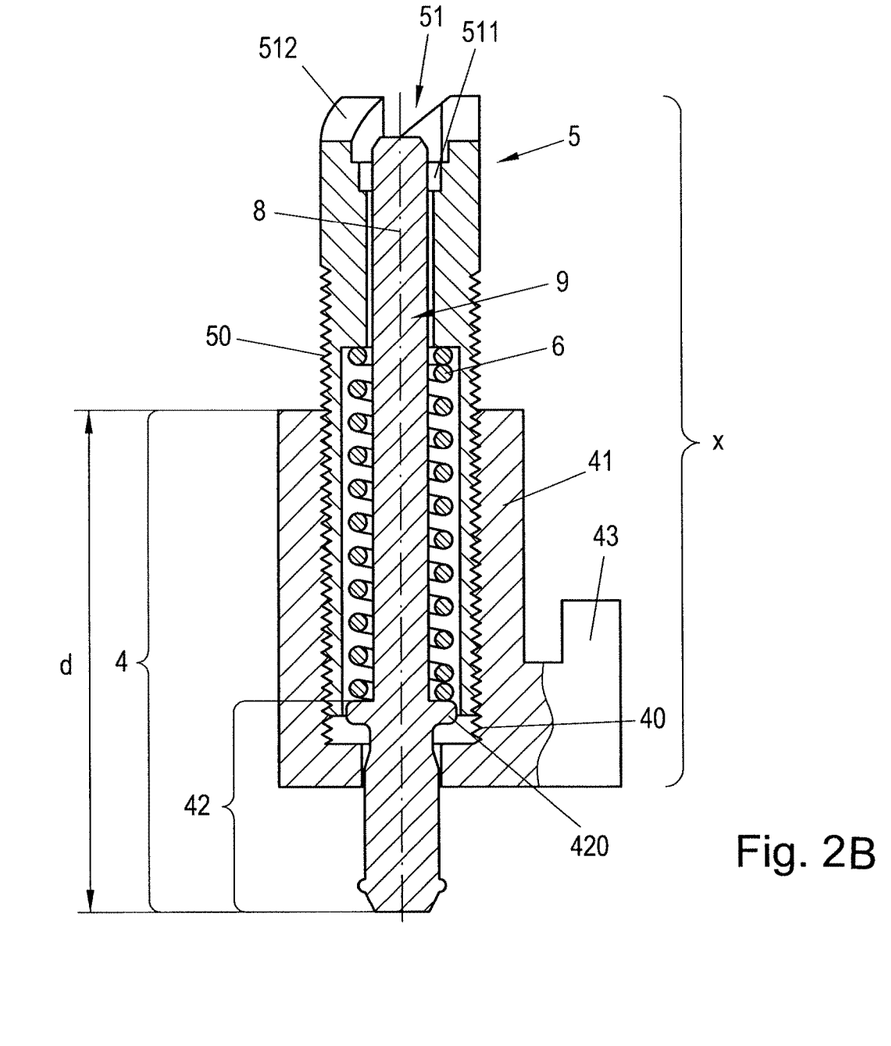

FIG. 2A is an exploded view of a first advantageous embodiment of the mounting element 1 according to the invention, and FIG. 2B is a longitudinal section through an assembled mounting element 1. A control unit 4 is assembled from a pressure element 41 and the counterpressure element 42, which are formed as separate components in this case. In addition, a bolt 9 is provided, the first end of which forms the counterpressure element 42 and the opposing second end of which forms the displacement element 8. The counterpressure element 42 and the displacement element 8 are thus formed as a common component in this embodiment. An actuation element 5 comprises a tool holder 51 comprising a mounting recess 511 (indicated as being hexagonal) for receiving a mounting tool 7. A possible embodiment of the tool holder 51 is described in more detail below, with reference to FIG. 5. In this case, the pressure element 41 is formed as a bush comprising an internal thread 40 at the recess of the bush. An external thread 50 is arranged at one end of the actuation element 5, which external thread is screwed into the internal thread 40 of the pressure element 41. The tool holder 51 is provided on the other axial end of the actuation element 5. The actuation element 5 can thus be screwed into or out of the pressure element 41 via the tool holder 51.

An axially continuous, central recess for receiving the bolt 9 that forms the pressure element 41 and the displacement element 8 is provided both on the actuation element 5 and on the pressure element 41. In this case, the counterpressure element 42 (first end of the bolt 9) is arranged in the recess of the pressure element 41 and protrudes axially from the pressure element 41. The displacement element 8 (second end of the bolt 9) is arranged in the recess of the actuation element 5. A radial projection 420 is provided on the bolt 9, which projection divides the bolt 9 axially into the counterpressure element 42 and the displacement element 8. In addition, the radial projection 420 functions as an axial stop for a first end of the clamping element 6 which is formed as a spiral spring in this case. The other end of the clamping element 6 rests on an axial stop in the recess of the actuation element 5. In this embodiment, the clamping element 6 thus connects the pressure element 41 and the counterpressure element 42 by means of the actuation element 5. The clamping element 6 generates the contact pressure p at the same time.

The extension of the actuation element 5 and pressure element 41 is adjusted, and the resilient clamping element 6 (in this case a spiral spring) is tensioned or unloaded by means of the thread position of the internal thread 40 and external thread 50. If the pressure element 41 is kept stationary, for example by means of a connection element 43 that is connected to the main body, and axial movement of the bolt 9 is simultaneously prevented when the control member 4 is at a specific length d, the clamping element 6 generates a specific contact pressure p, depending on the longitudinal extension x of the actuation element 5 and the pressure element 41 at a specified contact pressure p. As a result, the contact pressure p that the clamping element 6 exerts between the pressure element 41 and the counterpressure element 42 is set by the thread position of the internal thread 40 and the external thread 50.

The actuation element 5 can be actuated in the tightening direction A by means of a mounting tool 7 introduced into the mounting recess 511, in order to increase the contact pressure p of the resilient clamping element 6 between the pressure element 41 and the counterpressure element 42. When the actuation element 5 is actuated in the release direction B, the contact pressure is reduced analogously. In the embodiment shown, the tightening direction A is the screw-in direction of the internal thread 50 of the actuation element 5 into the external thread 40 of the pressure element 41, the release direction B being counter to the tightening direction A.

Figure 3A:
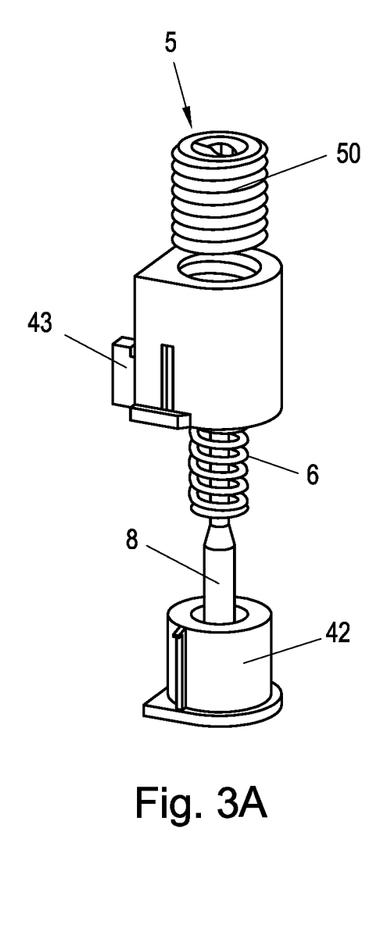
FIGS. 3A, B, C show a second embodiment of the mounting element.
Figure 3B:
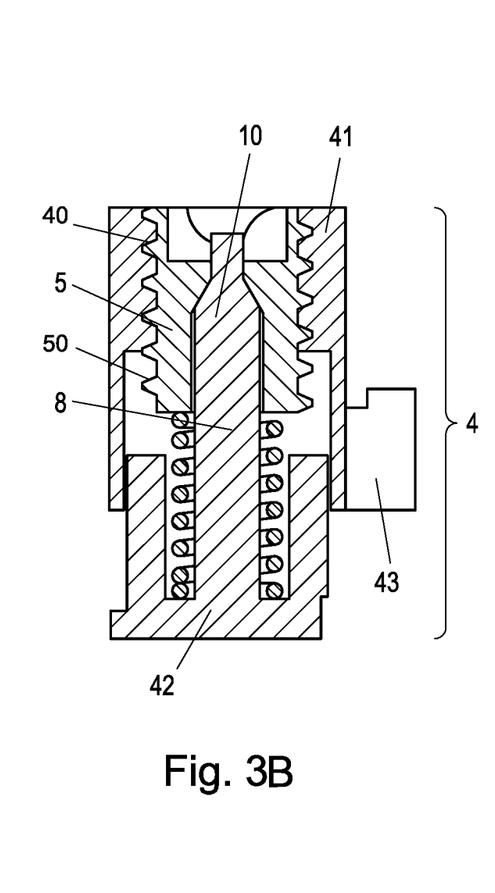
Figure 3C:
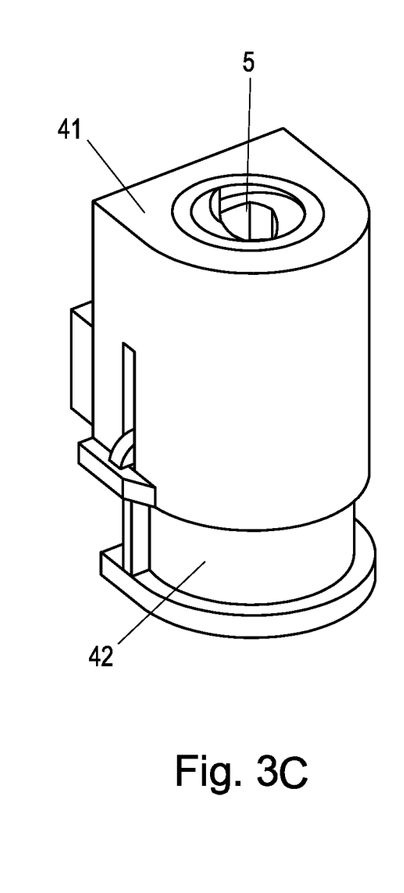

FIGS. 3A-C show an embodiment of the mounting element 1 similar to that of FIG. 1, FIG. 3A being an exploded view, FIG. 3B being a longitudinal section and FIG. 3C being a perspective view of the assembled mounting element 1. As in the embodiment according to FIG. 2, in this case, too, the pressure element 41 is formed as a bush comprising a central recess. The counterpressure element 42 is cylindrical and comprises a central, axially projecting pin 10 that forms the displacement element 8. An internal thread 40 is again provided at a first end of the pressure element 41, into which internal thread an external thread 50 of the actuation element 5 is screwed. The counterpressure element 42 is arranged at the second end of the pressure element 41 so as to slide axially in the central recess. A central continuous recess is again provided on the actuation element 5, in which recess the axial free end of the pin 10, which forms the displacement element 8, engages. A tool holder 51 is again provided on a first axial end of the actuation element 5. The clamping element 6 is arranged between the actuation element 5 and the counterpressure element 42, a first end of which clamping element rests on the counterpressure element 42 and the opposing second end of which clamping element rests on the actuation element 5. The clamping element 6 is likewise formed as a spiral spring in this case. The counterpressure element 42 is resiliently coupled to an actuation element 5 by means of the clamping element 6.

Figure 4A:
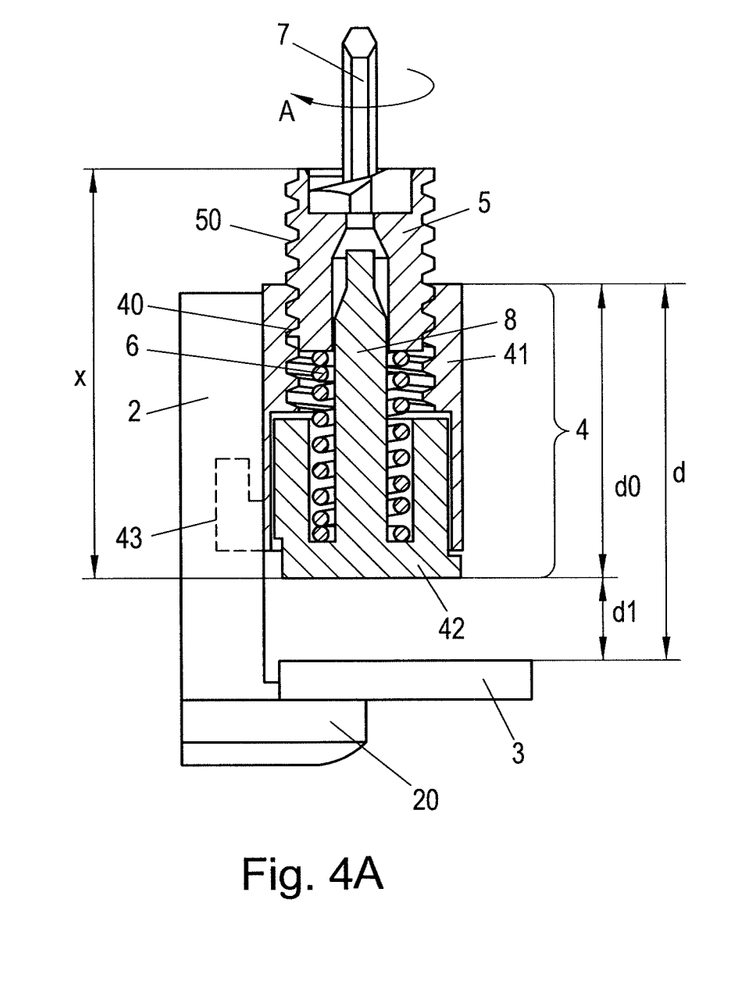
FIGS. 4A, B, C show the operating principle of the mounting element.
Figure 4B:
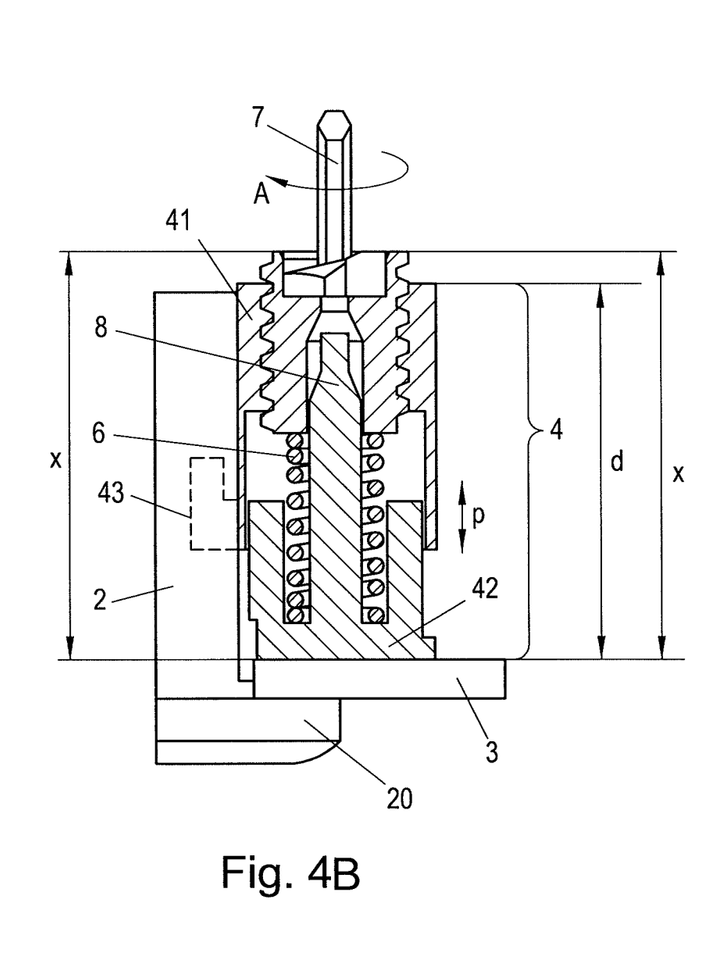
Figure 4C:
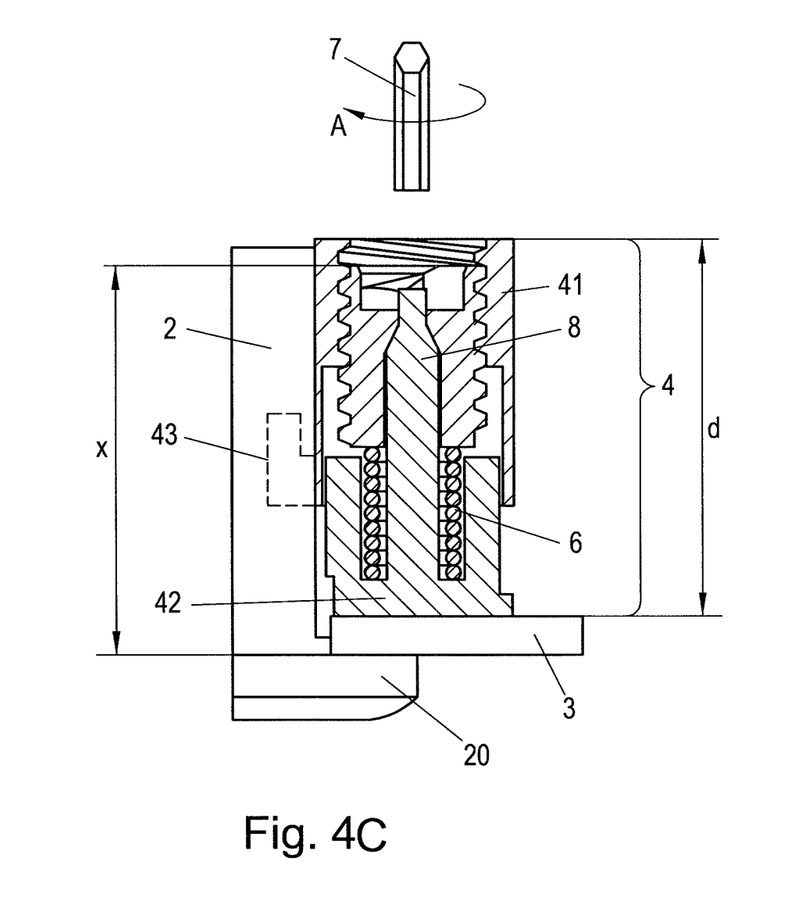

FIGS. 4A-C describe mounting a module 2 on a main body 3 using a mounting unit 1 according to the embodiment shown in FIGS. 3A-3C. For this purpose, the pressure element 41 is connected to the module 3 in a suitable manner, in this case by means of a connection element 43 on the pressure element 41, which connection element is hooked into a recess on the module 2. In FIG. 4A, the counterpressure element 42 and the main body 3 are still at a spacing d1 from one another, and the control element 4 has an initial length d0. Without any counterpressure being exerted on the counterpressure element 42 by means of the main body 3, the resilient clamping element 6 is in a relaxed position. When the actuation element 5 is actuated in the tightening direction A, the external thread 50 of the actuation element 5 is screwed further into the internal thread 40 of the pressure element 41, as a result of which the actuation element 5 presses the counterpressure element 42 further towards the main body 3 by means of the clamping element 6 that is not yet compressed, with the result that the longitudinal extension x of the actuation element 5 and counterpressure element 42 initially does not change. However, as soon as the counterpressure element 42 rest on the main body 3, the actual process of mounting the module 2 on the main body 3 can begin, and this is shown in FIG. 4b. When the actuation element 5 is actuated further in tightening direction A, the clamping element 6 is compressed, as a result of which a contact pressure p is built up between the pressure element 41 and a counterpressure element 42, by means of which contact pressure the counterpressure element 42 is pressed against the main body 3. In this case, the main body 3 rests on a mating clamping surface 20 of the module 2, such that the main body 3 is clamped between the module 2 and the counterpressure element 42.

The clamping element 6 and the geometry of the displacement element 8 are selected such that the displacement element 8 fills the mounting recess 511 of the tool holder 51 on the actuation element 5 and displaces the mounting tool 7 out of the mounting recess 511 as soon as the contact pressure p exceeds a specified maximum pressure pmax. The actuation element 5 thus cannot be actuated further, with the result that a defined contact pressure pmax is achieved. In this case, suitable dimensioning of the further components of the mounting element 1, in particular of the displacement element 8, is also essential and must be matched to the clamping element 6. It is thus necessary to ensure that the counterpressure element 8 fills the mounting recess 511 as soon as the clamping element 6 is compressed by the thread position of the internal thread 40 and the external thread 50 such that the maximum pressure pmax functions as the contact pressure p.

Figure 5:
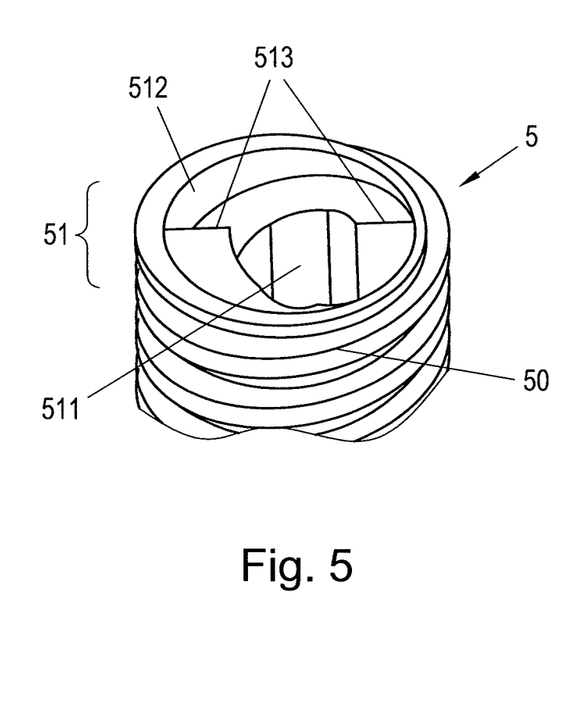
FIG. 5 shows a tool holder of the mounting element.

A possible embodiment of the tool holder 51 is shown in FIG. 5. A mounting recess 511 of the tool holder 51 is designed to receive a mounting tool 7, the mounting recess 511 in this case comprising a hexagonal recess in order to receive a hexagonal Allen wrench as the mounting tool 7. Of course, any other shape of mounting recess 511 and appropriate mounting tool 7 is also conceivable. If the counterpressure element 8 fills on account of a contact pressure p that corresponds to the maximum pressure pmax, the mounting tool 7 introduced into the mounting recess 511 is thus displaced. In addition, a dismantling recess 512 is provided in the tool holder 51, which recess axially adjoins the mounting recess 511 and comprises working surfaces 513 for a dismantling tool. The working surfaces 513 are for example axial projections in the dismantling recess 512 in order to be able to exert a torque on the actuation element 5 using a dismantling tool, for example a simple slot-head screwdriver. The working surfaces 513 are of course arranged so as to result in a stop for the dismantling tool in the opening direction, in order to allow for the actuation element 5 to be actuated in the release direction B. For example, the dismantling recess 512 comprises a flank that is beveled in the tightening direction A. It is thus possible, for example, to insert a slot-head screwdriver into the dismantling recess 512 of the tool holder 51 as the dismantling tool and to thus actuate the actuation element in the release direction B, because the dismantling tool strikes the working surfaces 513 formed by the flanks. However, in the event of actuation in the tightening direction A, the release tool B slides over the slopes of the flanks of the dismantling recess 512, as a result of which it is not possible to actuate the actuation element 5 in the tightening direction A. It is obvious that the dismantling recess 512 may not be filled by the displacement element 8 such that the dismantling tool cannot be inserted. For this purpose, in this embodiment the mounting recess 511 is sunk deeper into the tool holder 51 than the dismantling recess 512 is. As indicated in FIG. 2a, the dismantling recess 512 can extend as far as the radial edge of the tool holder 51 or, as in the embodiment according to FIG. 3 or 5, can be delimited radially to the outside in the tool holder 51.

What is claimed:

1. A mounting element configured for mounting a module on a main body, said mounting element comprising:
    a controller comprising a pressure element and a counterpressure element;
    a resilient clamping element arranged to act on the pressure element and on the counterpressure element;
    an actuation element comprising a tool holder having a mounting recess, the mounting recess being configured to receive a mounting tool to actuate the actuation element, and the actuation element increasing or reducing a contact pressure of the resilient clamping element between the pressure element and the counterpressure element when actuated in a tightening direction and a release direction, respectively;
    a displacement element coupled to the resilient clamping element, the displacement element being configured to fill the mounting recess and displace the mounting tool out of the mounting recess as soon as the contact pressure exceeds a maximum pressure;
    wherein the tool holder comprises a dismantling recess axially adjoining the mounting recess, the dismantling recess having a flank that is beveled in the tightening direction.

2. The mounting element according to claim 1, wherein the dismantling recess allows the actuation element to be actuated in the release direction, in order to reduce the contact pressure, when the mounting recess is filled by the displacement element.

3. The mounting element according to claim 2, wherein the dismantling recess is less deep than the mounting recess.

4. The mounting element according to claim 1, wherein the pressure element is formed as a bush having a central axially continuous recess and an internal thread is arranged at a first axial end of the central axially continuous recess of the pressure element.

5. The mounting element according to claim 4, wherein an external thread of the actuation element is screwed into the internal thread of the pressure element.

6. The mounting element according to claim 5, wherein a central axially continuous recess is provided on the actuation element, the mounting recess is provided on a first axial end of the actuation element and the displacement element is arranged in the central axially continuous recess of the actuation element.

7. The mounting element according to claim 6, wherein a central axially protruding pin provided on the counterpressure element forms the displacement element and is arranged in the central axially continuous recess of the actuation element.

8. The mounting element according to claim 7, wherein the resilient clamping element is arranged between the actuation element and the counterpressure element.

9. The mounting element according to claim 8, wherein the resilient clamping element is formed as a spring.

10. The mounting element according to claim 9, wherein the spring is a spiral spring.

* * * * *